United States Patent [19]

Reeder

[11] Patent Number: 4,464,540

[45] Date of Patent: Aug. 7, 1984

[54] SHIELD TERMINATION ENCLOSURE WITH ACCESS MEANS AND SHIELD CONNECTION DEVICE

[75] Inventor: Larry R. Reeder, San Jose, Calif.

[73] Assignee: Raychem Corporation, Menlo Park, Calif.

[21] Appl. No.: 379,817

[22] Filed: May 19, 1982

[51] Int. Cl.[3] .......... H02G 15/068

[52] U.S. Cl. .......... 174/35 C; 174/DIG. 8; 339/143 R

[58] Field of Search .......... 174/35 C, DIG. 8, 88 R; 339/143 R, DIG. 1; 285/132

[56] References Cited

U.S. PATENT DOCUMENTS

| | | | |
|---|---|---|---|
| 3,253,618 | 5/1966 | Cook | 174/DIG. 8 |
| 3,253,619 | 5/1966 | Cook et al. | 174/DIG. 8 |
| 3,541,495 | 11/1970 | Ellis et al. | 174/75 C |
| 3,761,844 | 9/1973 | Reeder | 174/DIG. 8 |
| 4,086,427 | 4/1978 | Nasuta et al. | 174/88 C |
| 4,144,404 | 3/1979 | De Groef et al. | 174/DIG. 8 |

FOREIGN PATENT DOCUMENTS

| | | |
|---|---|---|
| 7119226 | 10/1971 | Fed. Rep. of Germany . |
| 2524582 | 1/1976 | Fed. Rep. of Germany . |
| 2015538 | 4/1970 | France . |

*Primary Examiner*—G. P. Tolin
*Assistant Examiner*—D. A. Tone
*Attorney, Agent, or Firm*—Herbert G. Burkard; James W. Peterson

[57] ABSTRACT

Disclosed herein is a shield connection device for connecting EMI shielded cable shield to an EMI enclosure, the device includes an electrically conductive body defining a shield termination enclosure, the body having a plurality of openings extending through the body, the openings substantially parallel to longitudinal axis of the body and the body having means for accessing the opening. The connection device includes means adjacent the access means for applying fixable electrically conductive material to the opening through the access means for electrically connecting EMI cable shield thereto. In a preferred embodiment of the invention, the means for applying fixable electrically conductive material in the form of solder defines a heat-recoverable sleeve with a preform of solder on its interior. Sufficient material is provided for filling the opening with electrically conductive material to block EMI paths through the opening.

7 Claims, 5 Drawing Figures

SHIELD TERMINATION ENCLOSURE WITH ACCESS MEANS AND SHIELD CONNECTION DEVICE

BACKGROUND OF THE INVENTION

This invention relates to connection devices for cables having electromagnetic interference (hereinafter EMI) shields and, in particular, connection devices which are used to connect EMI shielded cables without the loss of EMI shielding effectiveness to an EMI enclosure.

As the need for EMI shielded cable has increased, better methods and devices for terminating such shields have been sought. It is generally required to terminate the EMI shield of such cable so that the cable may be connected to bulkheads, control panels, or other EMI enclosures.

An effective shield connection device provides a low impedance path to minimize the amount of electrical coupling and to increase overall EMI shielding efficiency. Particularly, the EMI captured by the EMI shield of the cable is drained through the connection device to ground via a low impedance path. The device generally prevents radiated EMI from entering the shield termination area. The device also confines any EMI energy from radiating from the EMI enclosure to the outside world.

Various methods and devices for terminating EMI shielded cable to solve the above-mentioned problems have been attempted. These methods and devices have included terminating individual cable shielded by attaching a simple ground lead wire to each shield and connecting the ground leads to the rear of a connector or other grounding point. This technique is known as "pigtailing." A more advanced device and technique for pigtailing involves self-pigtailing as discussed in Schwartz, U.S. Pat. No. 3,465,092, wherein a cylindrical, externally threaded element with a plurality of spaced longtitudinal slots is combined with the driving ring which is in threaded engagement with the cylindrical element. The driving ring rotates while carrying a contact annulus provided with a plurality of contact sections. Each contact section extends into a slot. Rotation of the ring moves the annulus and the contact section toward the end of the slot to position and hold leads of shielding.

It has been found that devices using this pigtailing technique have certain shortcomings. Among the shortcomings are that the devices are difficult to assemble and install. Additionally, known devices are typically bulky, inflexible and heavy. Such devices do not provide a block to radiated EMI which can travel parallel to the axis of the cables. It has been known for some time that the axial interstices between the individual shields can provide a window through which radiated EMI energy may travel.

Ellis, et al, U.S. Pat. No. 3,541,495 discloses a coaxial contact for terminating both the center conductor and the braid shield of a coaxial cable with soldered connections. Ellis, et al, includes outer contact which is provided with a window to permit radiant heat energy to be directed onto an internal sleeve and solder insert. A second heat-recoverable sleeve and solder insert are positioned around the outside of an outer contact with the solder insert located over a second window. When the cable is inserted into the contact, the center conductor is located under the first window and the braid is beneath the second window. Recovery of the external sleeve causes solder to be forced through the second window to make a soldered connection between the braid and the inside of the outer contact which is insulated from the inner contact.

The invention disclosed herein is a device for connecting the shield of one or more EMI shielded cables to an EMI enclosure. The device includes an electrically conductive body defining a shield termination enclosure, having a plurality of openings, extending from one end of the body to the other and located generally parallel to the longitudinal axis of the body. The body includes a means for accessing the opening. The device includes a means for applying fixable electrically conductive material to connect one or more cable EMI shields to the body. Sufficient conductive material is provided to fill the opening of the body, thereby, blocking possible EMI windows.

SUMMARY OF THE INVENTION

It is an object of this invention to provide an EMI shield termination enclosure which terminates one or more cable shields inserted therein and connected thereto and which blocks radiated EMI from passing through the enclosure.

It is another object of this invention to provide a device which provides a means for connecting a cable having an EMI shield to an EMI enclosure while preserving the desirable EMI shielding effects of the cable.

It is a further object of this invention to provide a shield connecting device which provides EMI shielded cables with a low impedance grounding path for grounding EMI conducted by the shield.

The shield connection device in accordance with this invention includes an electrically conductive body defining a shield termination enclosure, the body having a plurality of openings extending through the body and being substantially parallel to the longitudinal axis of the body. Each opening having a corresponding access means for accessing the opening. The device also includes means adjacent the access means for applying fixable electrically conductive material, such as solder, to the opening through the access means for electrically terminating an EMI shield, inserted within the opening, to the body and for filling the opening with electrically conductive material to block any EMI from passing through the opening.

The above described shield connection device is a labor efficient device, wherein the user slides the exposed end of a cable EMI shield into one end of the device. The exposed shield is positioned adjacent the access means and electrically conductive material is applied directly to the exposed shield to terminate the EMI shield and thereby the cable to the electrically conductive body and to fill the body openings.

With the cable terminated to the body in the above described manner, a solid electrical contact is made between the electrically conductive body and the EMI cable shield. EMI energy cannot enter along the path parallel to the wire through the openings since the conductive material has filled the body openings.

The above described construction permits the openings to be made, preferably, slightly larger than the largest expected diameter of the cable. The above described device is versatile in the sense that many various sized cables may be used in a single device in accordance with this invention.

The construction permits more than one EMI cable shield to be terminated in the same opening, since the access means allows conductive material to fill the interstices between the shields to be filled to block EMI.

Preferably, a transparent heat-shrinkable sleeve having a solder preform comprises the means for applying conductive material to the opening through the access means. This transparent heat-shrinkable sleeve preferably surrounds the body such that conductive material in the form of a solder preform is positioned adjacent the access means. As can be appreciated, the transparent heat-shrinkable sleeve permits inspection after termination. Additionally, a predetermined amount of solder is applied to the cable through the access means for precise soldering. A sufficient amount of solder or other conductive material having the characteristic of being flowable initially and solidfying subsequently, i.e. becoming fixed, is used to block the opening. Preferably, the quantity of conductive material is sufficient to completely fill any unused openings.

The openings positioned as described above encourages cables inserted within the body to be forced to the sides of the opening and into direct contact with the electrically conductive body when conductive material is applied to the opening through the access means. As compared with Ellis, supra, when fusible material is applied through the windows of Ellis equal pressures are created by the heat recoverable sleeve surrounding the openings urging the cable out of direct contact with the body. In Ellis the heat recoverable sleeve surrounds and is concentric with the body opening. As the sleeve recovers, fusible material is forced through the windows (access means) encouraging a cable within the body toward the longitudinal axis of symmetry of the body and away from direct contact with the body. The device of instant invention similarly includes a heat recoverable sleeve which also tends to recover symmetrically with the axis of symmetry of the body and the cables within the body are similarly urged toward the axis of symmetry of the body, although to a lesser extent since there is only one window (access means). However, since the openings are not concentric with the axis of symmetry, the cable or cables within the openings will be urged into direct contact with that body wall nearest the axis of symmetry of the body.

It will be appreciated that a number of different shapes shield termination enclosures may be used, e.g. cylindrical or rectangular. Regardless of which alternative is used, a number of different cables, each having different diameters may be connected to a single opening or enclosure. The user is thereby free to select large and small diameter cables for connection to any particular alternative.

Additionally, non-circular or odd shaped cables may be used in connection with this invention without a significant cost of labor efficiency or quality of EMI shield protection. Since the odd shaped cable will also be inserted into the body opening and conductive material would fill the opening, the particular shape of the cable need not match the shape of the opening.

Additionally, the device can be readily re-terminated, even after the joint between the device and cable has been made. All the user need do is reheat the device and remove and insert the cable desired.

In the case where the heat-recoverable sleeve is transported or where there is no sleeve, the quality of the joint may be viewed through the access means without destroying the joint itself. Thus, an additional advantage of the device in accordance with this invention is that it can be inspected without destruction of the joint.

DESCRIPTION OF THE PREFERRED EMBODIMENT

Figure 1:
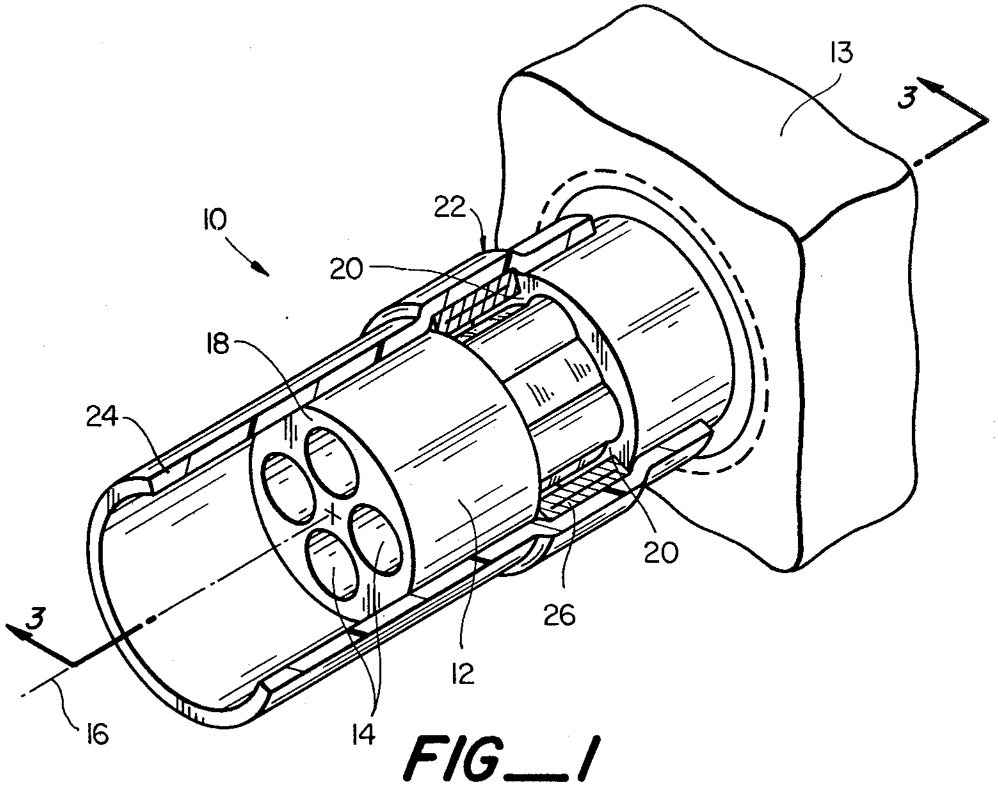
FIG. 1 is a perspective partially sectioned view of a shield connection device in accordance with this invention.

With reference to the Drawing, wherein like referenced characters designate like or corresponding parts throughout the several views and referring particularly to FIG. 1, there is shown a shield connection device in accordance with this invention generally indicated by the numeral 10.

The device includes an electrically conductive body 12 defining a shield termination enclosure having a plurality of openings 14 located in the body. The openings 14 extend from one end of the body through the other. As can be seen, the enclosure is preferably cylindrical and has a longitudinal axis 16. The openings 14 extend parallel to the longitudinal axis 16. The openings are located eccentrically, i.e., not concentric with the axis of symmetry of the body, along the outer periphery 18 of the body 12 so that they may be easily accessed and for other reasons which become clear hereinafter.

The body includes means 20 for accessing the openings. The access means 20 define a groove which may be used to locate the means for applying conductive material so that the material is directed through the access means. While in the preferred embodiment the groove could be said to have a longitudinal axis which runs parallel to the longitudinal axis 16, it will be appreciated that the means for accessing the openings must communicate with the openings and are therefore perpendicular to the longitudinal axis 16 of the body. After connection of the shield to the body, the access means 20 provide means for inspecting the joint between a cable EMI shield and the body.

The device 10 includes a means generally indicated by the numeral 22 for applying fixable electrically conductive material 26 to openings 14 through access means 20. The preferred means 22 is a heat recoverable sleeve 24 having a material 26, which is conductive, initially flowable and which in some way changes to a generally fixed state to block radiated EMI, such as solder and preferably a solder preform. It will be appreciated that material 26 may be a conductive epoxy which is initially a liquid, can be flowed into access means 20 and cured to connect a cable shield to the body 12 and block radiated EMI. The sleeve 24 is positioned so it surrounds the body 12 and further positioned so that the material 26 is located adjacent the access means 20 as explained above. In the preferred embodiment the material 26 is a solder preform which includes a flux composition either in its core or on its exterior. The preferred sleeve is cross-linked by the methods and for the reasons stated in Cook, U.S. Pat.

No. 3,253,618 and Cook, et al, U.S. Pat. No. 3,253,619 which are incorporated herein.

Figure 2:
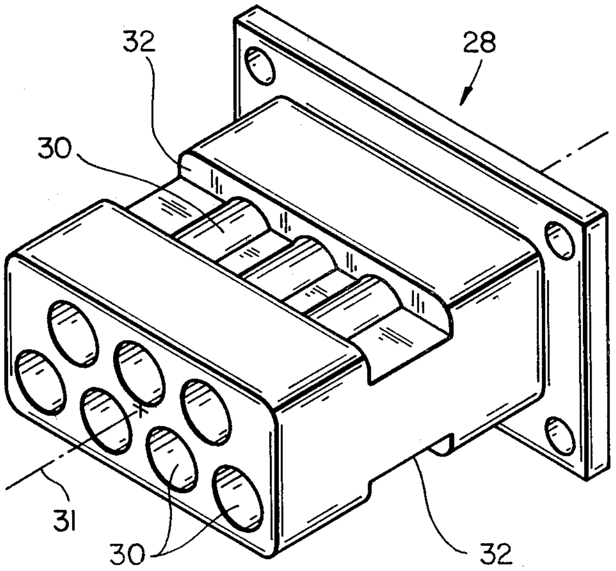
FIG. 2 is a perspective view of an alternative shield termination enclosure in accordance with this invention.

With particular reference to FIG. 2 there is shown an alternative shield termination enclosure in accordance with this invention, generally indicated by the reference numeral 28. The enclosure 28 is similarly electrically conductive and has a plurality of openings 30 which are substantially parallel to longitudinal axis 31. Each opening 30 similarly has a corresponding access means 32 for accessing the openings 30. Similarly, the openings 30 are capable of receiving cable having EMI shields. The access means 32 directs the flow of material 26 to the cable shields for connection of the shield to the body to provide a ground path for conducted EMI and for blocking radiated EMI from passing through the openings 30.

Figure 3:
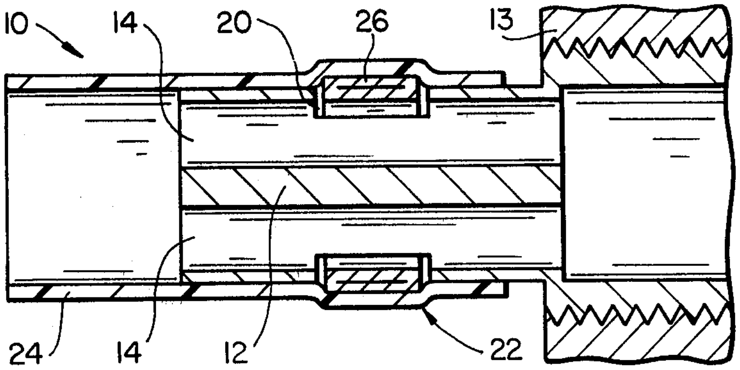
FIG. 3 is a cross-sectional view taken along section line 3—3 of FIG. 1.
Figure 4:
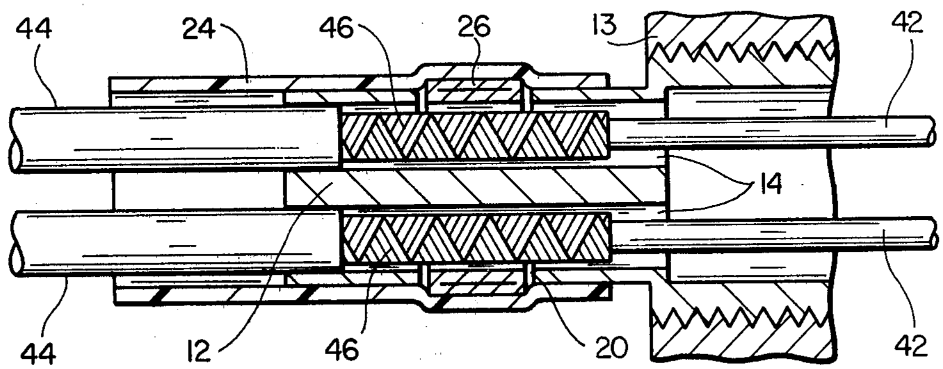
FIG. 4 is the same as FIG. 3 having cables inserted in the openings.
Figure 5:
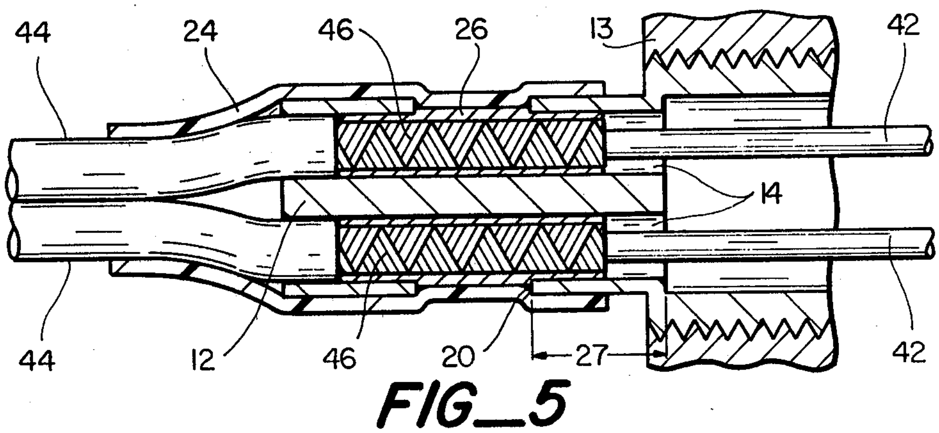
FIG. 5 is the same as FIG. 4 after heat-recovery.

With particular reference to FIG. 3 through FIG. 5, there is shown the preferred usage of device 10. FIG. 3 illustrates a sectional side view of device 10 prior to insertion of cables 42 into openings 14. As can be seen clearly in FIG. 4, insulation 44 surrounding EMI shield 46 is stripped back to expose the EMI shielding, which in the conventional case comprises braid. As seen in FIG. 4, insulation 44 may be found within opening 14 without adverse effects. An advantage of the present invention is that the amount of insulation stripped off is not critical. Preferably, sufficient insulation should be removed to expose shield 46 to the access means 20. However, as long as the shield 46 contacts the body 12 between the access means 20 and the bulkhead 13 with material 26 filling any void between the shield 46 and the body 12, EMI path will be blocked and a low impedance, grounding path provided.

With reference to FIG. 5, in use, the device 10 is heated so that the heat-recoverable sleeve 24 recovers while the material 26 flows through access means 20 into opening 14. As heating is continued on the sleeve 24, the sleeve shrinks, forcing the material 26 to be spread throughout the opening 14. Suffficient material 25 is provided so that upon recovery each opening 14 is blocked. Where solder is used the device is allowed to cool, fusing each cable 42 through their shields 46 to the body 12. In the event that one or more openings do not contain a shield 46 there is sufficient conductive material 26 to completely block the unoccupied opening. Blocking does not require complete filling of the entire length of the opening but rather requires complete filling of a particular opening at a given cross-section. As discussed earlier, that cross-section must be within that portion of the opening between the access means 20 and the bulkhead 13. This cross-section is noted by dimension 27 in FIG. 5. Direct electrical contact between the body 12 and cable 42 is thereby provided, blocking radiated EMI from entering through openings 14 and/or access means 20 and providing a low impedance grounding path for draining conducted EMI energy captured by the shield along the entire length of the shield.

By using a cross-linked , i.e., melt resistant, heat-recoverable sleeve 24, fusible material such as high temperature solder may be used. Additionally, a greater variety of heating sources may be used.

The heat-recoverable sleeve 24 is preferably transparent to enable the user to inspect the joint between the body 12 and the cable 42 through access means 20 as explained earlier.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the apended claims rather than the foregoing description and all equivalents thereto being intended to be embraced therein.

What is claimed is:

1. A shield termination enclosure for terminating one or more EMI shielded cables to be inserted therein and connected thereto, the enclosure comprising:

an electrically conductive body having a longitudinal axis and an outer periphery and having a plurality of openings extending therethrough, the openings being substantially parallel to said axis and each opening having a corresponding access means for accessing the opening, each access means comprising a groove in the outer periphery of the body which defines means for inspecting the EMI cable shield within the opening and for inspecting a joint formed between the body and the EMI cable shield, said openings capable of receiving EMI cable shield to be inserted within the openings and said access means allowing the flow of fixable electrically conductive material to connect cable shield to the body and to block radiated EMI from passing through the openings.

2. A shield connection device, comprising:

an electrically conductive body defining a shield termination enclosure including an electrically conductive body having a longitudinal axis and an outer periphery and having a plurality of openings extending therethrough, the openings being substantially parallel to said axis and each opening having a corresponding access means for accessing the opening, each access means comprising a groove in the outer periphery of the body which defines means for inspecting the EMI cable shield within the opening and for inspecting a joint formed between the body and the EMI cable shield, said openings capable of receiving EMI cable shields to be inserted within the openings; and means adjacent and in contact with each access means for applying fixable electrically conductive material to each opening through each respective access means for electrically connecting EMI cable shield to be inserted within the opening to the body and for filling the opening with fixable electrically conductive materials to block radiated EMI from passing through the openings.

3. A device as set forth in claim 2, wherein the means for applying fixable electrically conductive material to the opening comprises a heat-recoverable sleeve having fixable electrically conductive material, the sleeve surrounding the body and the material aligned with the access means.

4. A device as set forth in claime 3, wherein the fixable electrically conductive material comprises a fusible material.

5. A device as set forth in claim 4, wherein the heat-recoverable sleeve is made from cross-linked material.

6. A device as set forth in claim 3 wherein the fixable electrically conductive material comprises conductive epoxy.

7. A device as set forth in claim 6, wherein the sleeve is transparent.

* * * * *